United States Patent [19]

Takagi

[11] Patent Number: 5,367,672
[45] Date of Patent: Nov. 22, 1994

[54] APPARATUS FOR RETRIEVING DATA USING THE REMAINDER OF A HASHED SEARCH KEY TO IDENTIFY A GROUP OF KEYS AND COMPARING THE KEY TO THE GROUP OF KEYS

[75] Inventor: Shiro Takagi, Yokohama, Japan

[73] Assignee: Kabushiki Kaisha Toshiba, Kawasaki, Japan

[21] Appl. No.: 739,513

[22] Filed: Aug. 2, 1991

[30] Foreign Application Priority Data

Aug. 3, 1990 [JP] Japan .................... 2-206378

[51] Int. Cl.⁵ .......................... G06F 15/40
[52] U.S. Cl. .................. 395/600; 364/282.1; 364/283.4; 364/252.4; 364/DIG. 1; 395/400
[58] Field of Search ............ 395/600, 425, 400

[56] References Cited

U.S. PATENT DOCUMENTS

| | | | |
|---|---|---|---|
| 3,670,310 | 6/1972 | Bharwani et al. ............. | 340/172.5 |
| 4,468,728 | 8/1984 | Wang ............................ | 395/600 |
| 4,575,798 | 3/1986 | Lindstrom et al. .......... | 395/600 |
| 4,611,272 | 9/1986 | Lomet .......................... | 395/600 |
| 4,775,956 | 10/1988 | Kaji et al. .................... | 364/900 |
| 4,991,087 | 2/1991 | Burkowski et al. .......... | 364/200 |
| 4,999,790 | 3/1991 | Murayama et al. .......... | 364/521 |
| 5,210,868 | 5/1993 | Schimada et al. ........... | 395/600 |

*Primary Examiner*—Thomas C. Lee
*Assistant Examiner*—Larry J. Ellcessor
*Attorney, Agent, or Firm*—Cushman, Darby & Cushman

[57] ABSTRACT

According to this invention, an image storage/retrieval apparatus classifies a plurality of keywords into groups constituting retrieval data assigned with image numbers corresponding respective images, performs a primary retrieving process for retrieving a group keyword for specifying the groups, extracts candidate images, and then selects a predetermined image from the extracted candidate images. The plurality of images are stored in an optical disk, and image management data is stored in a image management table.

1 Claim, 6 Drawing Sheets

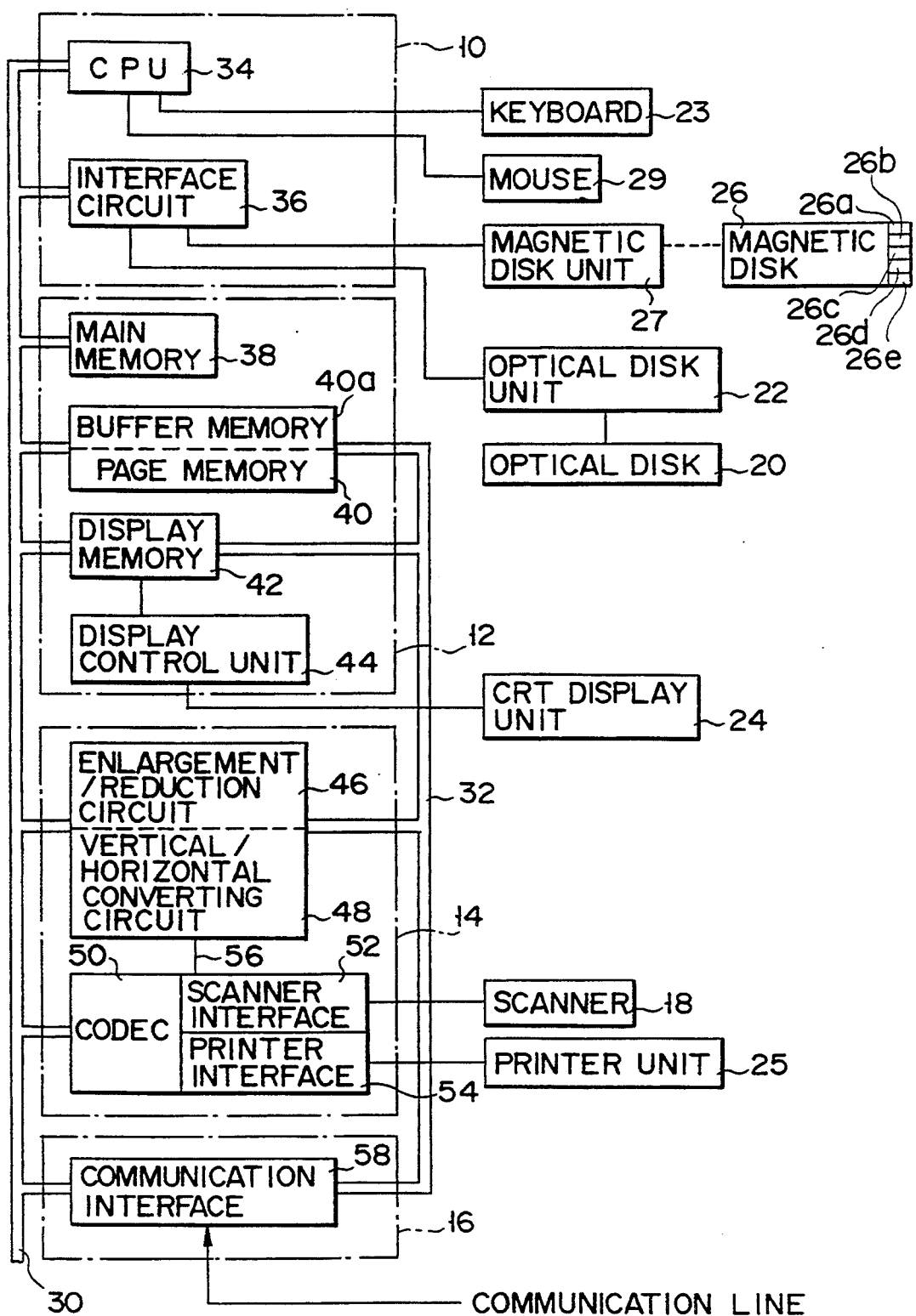
F I G. 1

FIG. 2

| OPTICAL DISK NAME | NUMBER OF ALL IMAGES |
|---|---|
| PATENT DATA IN 1990 | 100 |

| IMAGE NO. | IMAGE SIZE | START ADDRESS | TITLE (100 BYTE) | FIRST KEYWORD NO. | SECOND KEYWORD NO. | --- | TENTH KEYWORD NO. |
|---|---|---|---|---|---|---|---|
| 1 | A4 | 0 | ELECTRIC FILING APPARATUS | 1 | 2 | --- | 0 |
| 2 | A4 | 100 | CODING METHOD | 50 | 0 | --- | 0 |
| | | | | | | | |
| 100 | | | | | | | |

| COUNT REPRESENTING ALL TYPES OF KEYWORD NUMBER |
|---|
| 50 |

| KEYWORD NUMBER | KEYWORD |
|---|---|
| 1 | OPTICAL DISK |
| 2 | SCANNER |
| | |
| 50 | IMAGE CODING |

| IMAGE NUMBER | GROUP KEYWORD (HEXADECIMAL) 2 BYTES |
|---|---|
| 1 | 0006 |
| 2 | 0004 |
| | |
| 100 | |

26e

— 0TH GROUP
— FIRST GROUP

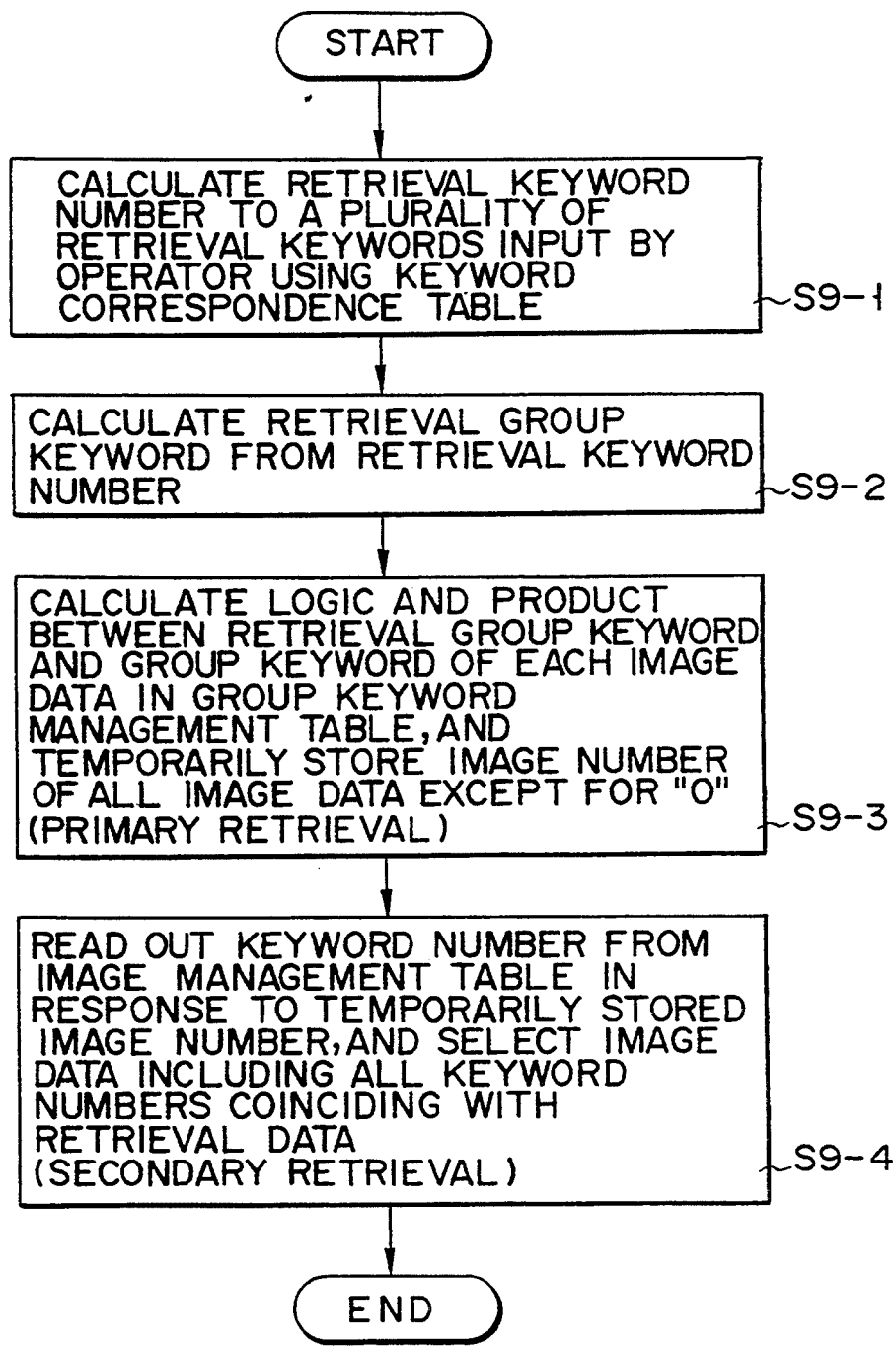
F I G. 9

APPARATUS FOR RETRIEVING DATA USING THE REMAINDER OF A HASHED SEARCH KEY TO IDENTIFY A GROUP OF KEYS AND COMPARING THE KEY TO THE GROUP OF KEYS

BACKGROUND OF THE INVENTION

1. Field of the Invention

The present invention relates to an image storage/retrieval apparatus for retrieving a desired image by designating one of a plurality of keywords which are assigned to respective images, thereby obtaining high-speed retrieval process. It is related more particularly to an image storage/retrieval apparatus wherein a plurality of keywords are classified into several groups. Specifically a group corresponding to respective keywords is assigned to images when the images are stored, a bit at a position corresponding to a given group is enabled and the remaining bits are disabled to calculate a value, this value is called an image group keyword. A pair of the image group keywords and their corresponding images are then stored. When a retrieval group keyword, in which the bit corresponding to the given image group is enabled, is calculated from a keyword input, an image group keyword is compared with the retrieval group keyword. Candidate images to be retrieved are determined and extracted in units of a plurality of keywords, and conventional retrieval which is performed using keywords as units is performed on the extracted candidate images to extract a desired image from the candidate images.

2. Description of the Related Art

In recent years, an image storage/retrieval apparatus such as an image filing apparatus has been used in practice. In the image storage/retrieval apparatus, images such, as a large number of documents, are optically read by a two-dimensional scanner in the two-dimensional scanning process, the read images are stored in an optical disk, and the arbitrary image stored in the optical disk is retrieved, read out, and output in a visual state at an output unit such as a CRT display unit or a printer.

In the above apparatus, a method such as a free text retrieving method is utilized. That is, in order to find a target image, a retrieval keyword is input, keyword retrieval for selecting an image assigned with the keyword is performed, a character string for retrieval is input, and the image assigned with a title including the character string is selected.

In the above image filing apparatus, a keyword and a title assigned to each managed image are both stored in an optical disk at a storage destination used for storing images, and in a magnetic disk serving as another hardware. When the above retrieving process is to be performed, keywords and titles assigned to all managed images are read out from the optical disk or the magnetic disk, and the keywords and the titles are compared with an input retrieval keyword and an input character string.

In general, keyword numbers are assigned to keywords assigned to images, and the keyword numbers are recorded in units of images.

In such a system, assume that the number of managed images is 1,000, that the average number of keywords assigned to each image is 5, and that a keyword number is expressed by 2 bytes. In this case, data of 10 bytes is read out per image, i.e., data of 10,000 bytes (about 10 kB) is read out as a whole, and the data is compared with a retrieval keyword.

When a character string length of a title assigned to an image is 100 bytes, a total of data of 100,000 bytes (about 100 kB) is read out and compared with a retrieval character string.

Therefore, when the number of managed images or the number of keywords assigned to the images is increased or when the character string length of titles assigned to the images is increased, the amount of data to be compared with a retrieval keyword or a retrieval character string is largely increased, thereby requiring increased retrieval time.

SUMMARY OF THE INVENTION

It is an object of the present invention to provide an image storage/retrieval apparatus which can solve the following drawbacks of prior art. When the number of managed images and the number of keywords assigned to the images are increased, the amount of data to be compared with a retrieval keyword is largely increased, so that retrieval requires a long time. In the image storage/retrieval apparatus of the present invention, even when both the number of managed images and the number of keywords assigned to the images are increased, since images are coarsely retrieved using keywords for specifying groups obtained by classifying the retrieval keywords, the number of images normally retrieved using all keywords, (i.e., an amount of data to be compared with retrieved keywords), can be largely reduced, and keyword retrieval can be performed at a high speed.

In order to achieve the above object, according to the present invention, there is provided an image storage/retrieval apparatus comprising: first storing means for storing a plurality of images; second storing means for storing a plurality of retrieval data assigned with image numbers corresponding to the respective images, each retrieval image being constituted by a plurality of keywords; third storing means for storing keyword numbers corresponding to the respective keywords; fourth storing means for storing group keywords specifying groups obtained by grouping the keywords, the group keywords corresponding to the respective image numbers; primary retrieval means for extracting candidate images by retrieving the group keyword, the primary retrieval means being constituted by input means for inputting at least one retrieval keyword, processing means for reading out from the third storing means a keyword number corresponding to the keyword input by the input means, means for generating a group keyword from the keyword number read by the processing means, first image number extracting means for sequentially comparing the plurality of group keywords stored in the fourth storing means with the group keywords generated by the generating means to extract an image number corresponding to the same group, and second image number extracting means for sequentially comparing a keyword stored in the second storing means and corresponding to the image number extracted by the first image number extracting means with the keyword input by the input means, and for extracting the image number including a keyword; and secondary retrieval means for retrieving a predetermined image, the secondary retrieval means being constituted by selecting means for selecting a desired image from the candidate images extracted by the second image number extracting means and means for retrieving the image selected by the selecting means from the first storing means.

With the above arrangement, in the image storage/retrieval apparatus of the present invention, a plurality of keywords are classified into groups, the primary retrieving process is performed by retrieving group keywords, and images to be retrieved are extracted. In addition, the secondary retrieving process for selecting a desired image from the extracted images to be retrieved. Therefore, an amount of comparison data can be largely decreased compared with a conventional method wherein all images are retrieved by keywords to select a desired image, and the keyword retrieving process can be performed as a high speed.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram schematically showing an arrangement of an image storage/retrieval apparatus according to the present invention;

FIG. 2 shows a description in an image management table;

FIG. 3 shows an image management table in which a plurality of retrieval data assigned with image numbers are stored;

FIG. 4 is a table in which a count of types of keywords are stored;

FIG. 5 is a table for storing keywords corresponding to keyword numbers;

FIG. 9 is a flow chart for explaining retrieval in the apparatus of the present invention.

DETAILED DESCRIPTION OF THE PREFERRED EMBODIMENTS

Figures 6, 7:
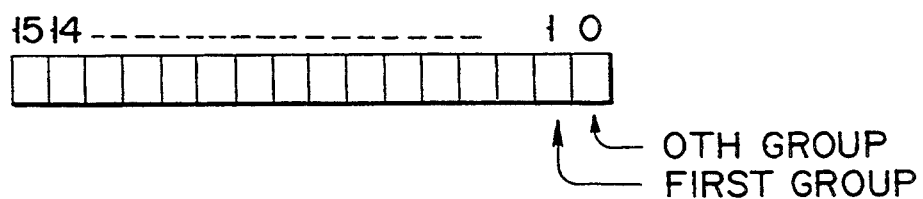
FIG. 6 is a table for storing group keywords corresponding to respective image numbers.
FIG. 7 is a view showing an arrangement of the group keywords.

An embodiment of the present invention will be described below with reference to the accompanying drawings.

FIG. 1 shows an image filing apparatus serving as an image storage/retrieval apparatus of the present invention. That is, the image filing apparatus comprises a control module 10, a memory module 12, an image processing module 14, a communication control module 16, a scanner unit 18, an optical disk 20, an optical disk unit 22, a keyboard 23, a CRT display unit 24, a printer unit 25, a magnetic disk 26, a magnetic disk unit 27, a mouse 29, a system bus 30, and an image bus 32.

The control module 10 is constituted by a CPU 34 for performing various control operations for storing, retrieving, and editing an image, and an interface circuit 36 for connecting the CPU 34 to the optical disk unit 22 and the magnetic disk unit 27. The keyboard 23 and the mouse 29 are connected to the CPU 34. In the CPU 34, when an image retrieved from the optical disk 20 and an image supplied from the scanner unit 25 and stored in a page memory 40 (described later) are to be printed by the printer unit 25, and the sizes of the images are largely different from each other, the image in the page memory 40 is enlarged/reduced by an enlargement/reduction circuit 46 (described later). The image is stored in the page memory 40 again and enlarged/reduced by the enlargement/reduction circuit 46 to be output to the printer unit 25.

The memory module 12 is constituted by a main memory 38 for storing management data and various control programs for storing, retrieving, and editing an image, the page memory 40 serving as an image memory having a memory capacity corresponding to images of several originals each having a size of A4, a display memory 42 serving as a display interface, a display control unit 44, and the like. A buffer memory area 40a is assured in a part of the page memory 40. In the buffer memory region 40a, write and read operations are controlled by a counter (not shown). The page memory 40 is a memory for temporarily storing, e.g., an image stored in the optical disk 20 or an image read out from the optical disk 20. An image really displayed in a display window (not shown) of the CRT display unit 24, i.e., an image obtained by enlarging, reducing, rotating, inserting, or reversing the image in the page memory 40, is stored in the display memory 42.

The image processing module 14 is constituted by an enlargement/reduction circuit 46 for enlarging/reducing an image, a vertical/horizontal conversion circuit 48 for rotating an image by vertically/horizontally converting the image, a compression/expansion circuit (CODEC) 50 for perform coding for compressing (reducing redundancy) an image and expanding (the reduced redundancy is restored to the original redundancy) the image, a scanner interface 52 for the scanner unit 18, a printer interface 52 for the printer unit 25, an internal bus 56 for connecting the enlargement/reduction circuit 46, the vertical/horizontal converting circuit 48, the compression/expansion circuit 50, the scanner interface 52, and the printer interface 54.

The communication control module 16 is constituted by an communication interface 58 such as a BCP (Bus communication Processor) connected to, e.g., a LAN. A UCP (Universal Communication Processor) connected to an external unit such as an FCP (facsimile connection mechanism) and a personal computer through an interface may be arranged in the communication module 16.

The communication control module 16 supplies retrieval data transmitted through a communication line to the main memory 38 and transmits an image corresponding to the transmitted retrieval data. In addition, the communication control module 16 supplies an image stored in the optical disk 20 to the page memory 40 and supplies retrieval data corresponding to the image to the main memory 38.

The system bus 30 is a bus for control signals of various units, and connects the control module 10, the memory module 12, the image processing module 14, and communication control module 16. The image bus 32 is a bus for an image and connects the memory module 12, the image processing module 14, and the communication control module 16.

The scanner unit 18 is a two-dimensional scanner unit. It two-dimensionally scans an original (document) with a laser beam to obtain an electric signal corresponding to the image on the original. The scanner unit 18 can scan not only a sheet having a document size such as A3, A4, and B4 sizes, but a drawing having a large size such as A1 and A2 sizes.

The optical disk unit 22 sequentially stores an image read by the scanner unit 18 in the optical disk 20. Image data corresponding retrieval data addressed by the keyboard 23 is retrieved from the optical disk 20.

The keyboard 23 inputs inherent retrieval data corresponding to image data to be stored in the optical disk 20 and commands for various operations such as storing, retrieving, editing operations.

A mouse pointer (cursor) displayed on the display window of the CRT display 24 is arbitrarily moved in vertical and horizontal directions with the mouse 29. When the mouse pointer is located at a desired position, a command is given by the mouse 29, and a display content (various operation modes, icon, or the like) at which the mouse pointer is located is selected and designated.

The CRT display unit (cathode-ray tube display unit) 24 displays the image read by the scanner unit 18 and the image retrieved from the optical disk 20. A display region for displaying the image of the CRT display unit 24 is given by a multi-window display unit capable of simultaneously displaying four images using four or less windows (not shown). An editing process such as enlarging, reducing, rotating, or scrolling processes is performed to each of the images displayed in the display window.

The printer device 25 prints out (hard copy) the image read by the scanner unit 18 and the image retrieved from the optical disk 20 or the image displayed on the CRT display unit 24.

The magnetic disk unit 27 stores various control programs in the magnetic disk 26 mounted in the magnetic disk unit 27. The magnetic disk unit 27 includes image managing tables 26a and 26b, keyword correspondence tables 26c and 26d, and a keyword managing table 26 for specifying a group as shown in FIGS. 2 to 6. A storage content in the magnetic disk 26 is transferred to the main memory 38 when the magnetic disk unit is turned on.

The name of an optical disk in which images are stored and the number of all images are stored in the image managing table 26a. As shown in FIG. 2, for example, "patent data in 1990" is stored as a disk name, and "100 cases" is stored as the number of all the images.

Each image number, each image size, and a start address representing the start position of an image storage area in the optical disk 20, and titles assigned to these images, e.g., 10 keyword numbers, are stored in the image managing table 26b.

The titles are expressed by the SJIS codes, and a 100-byte area is assured for the titles in the optical disk 20. When a 2-byte kanji code is used, a maximum of 50 codes can be stored. When a 1-byte ANK code is used, a maximum of 100 codes can be stored.

Each keyword number is expressed by 2 bytes (16 bits), and "0" means that no keyword is set. A maximum of 65,535 ($2^{16}-1$) types of keywords can be set.

As shown in FIG. 3, an image size "A4", a start address "0", a title "electric filing unit", and keyword numbers "1" and "2" are stored in an area corresponding to an image number "1", and an image size "A4", a start address "100", a title "coding method", and a keyword number "50" are stored in an area corresponding to an image number "2".

In the keyword correspondence table 26c, a count representing the number of different types of keywords assigned to the images is stored. For example, as shown in FIG. 4, "50" is stored as a count representing the number of different types of keyword numbers.

Keyword numbers and keyword character strings corresponding thereto are stored in the keyword correspondence table 26d by a count representing all types of the keyword numbers. For example, as shown in FIG. 5, a keyword having a keyword number "1" represents "optical disk", and a keyword having a keyword number "2" represents "scanner".

In the group keyword management table 26e, group keywords generated from keyword numbers assigned to the images are represented by a code which indicates each of the keyword numbers corresponding to the image. As shown in FIG. 6, an image number "1" corresponds to a group keyword "0006" (hexadecimal number), and an image number "2" corresponds to a group keyword "0004" (hexadecimal number).

Group keywords represent correspondences between groups and a plurality of keywords assigned to images, when all the keywords are classified into several groups (e.g., 16 groups). The group keywords are respectively stored to the images and expressed by the same number of bytes as a keyword number, e.g., 2 bytes (16 bits). In this case, as shown in FIG. 7, the 0th to 15th groups are respectively assigned to the 0th to 15th bits of 16 bits.

A relationship between keywords and groups will be described below. A bit corresponding to a remainder obtained by dividing a keyword number except for "0" by "16" is set to be "1" so as to determine a group number. For example, a keyword having a keyword number "1" is determined to represent a group "1" because a remainder obtained by dividing the group number "1" by 16 which is a bit count constituting a group keyword is "1". In addition, a keyword having a keyword number "2" is determined to represent a group "2" because a remainder obtained by dividing the "2" by 16 is "2", and a keyword having a keyword number "50" is determined to represent a group "2" because a remainder obtained by dividing "50" by 16 is "2". Therefore, when an image number is "1", since the image number "1" is constituted by the keyword numbers "1" and "2", as shown in FIG. 3 the image is determined to correspond to the groups "1" and "2". The image corresponds to a group keyword "0000000000000110" (binary number) in which flags for the second and third bits are set, i.e., "0006" (hexadecimal number).

With the above arrangement, an operation will be described below. First, registration of images will be described. A registration mode is selectively set by the keyboard 23, and titles several keywords serving as retrieval data of images to be stored in the optical disk 20 are input. The CPU 34 checks validity of the input retrieval data in accordance with a format which is defined in advance. The CPU 34 checks double registration by comparing the input retrieval data with retrieval data registered on the optical disk 20. In accordance with the result of the check, the input retrieval data is stored in the main memory 38.

An original is set on the scanner unit 18, and the CPU operates the optical disk unit 22 and the scanner unit 18. The scanner unit 18 two-dimensionally scans the images on the document or the like to photoelectrically convert the images from an optical signal to an electrical signal. Line data of the photoelectrically converted images are sequentially stored in the page memory 40. The images stored in the page memory 40 are stored in the display memory 42, and the stored content is displayed on the CRT display unit 24. The skew, concentration, resolution, and the like of the images displayed on the CRT display unit 24 are monitored. When the displayed images are satisfactory, a storage key (not shown) is turned on. At this time, the CPU 34 causes the compression/expansion circuit (CODEC) 50 to code the images stored in the page memory 40 every line by the well-known MR (Modified Read) method or the like. The coded image data is supplied to the optical disk unit 22 through the interface circuit 36 to be stored in the optical disk 20.

when image storage in the optical disk 20 is finished, the CPU 34 stores a physical track address which corresponds to the location of the image, a start address determined by a physical sector address, an image length expressed by a block length, and the like in the tables 26a to 26e of the main memory 38.

When a new image number is assigned, the number of images in the image management table 26a is incremented by one, and one line is added in the image management table 26b. An image size and a start address are stored in the optical disk 20. A title input by an operator is stored in the image management table 26b. A keyword number of a keyword input by the operator is calculated using the keyword correspondence table 26d and stored in the image management table 26b. When the keyword input by the operator is new, one line is added in the keyword correspondence table 26d, and a new keyword number is assigned. A count representing all types of keyword numbers is incremented by one, and the obtained count is stored.

A group keyword is derived from the keyword numbers stored in the image management table 26b, one line is added in the group keyword management table 26e, and the group keyword is stored together with an image number.

Figure 8:
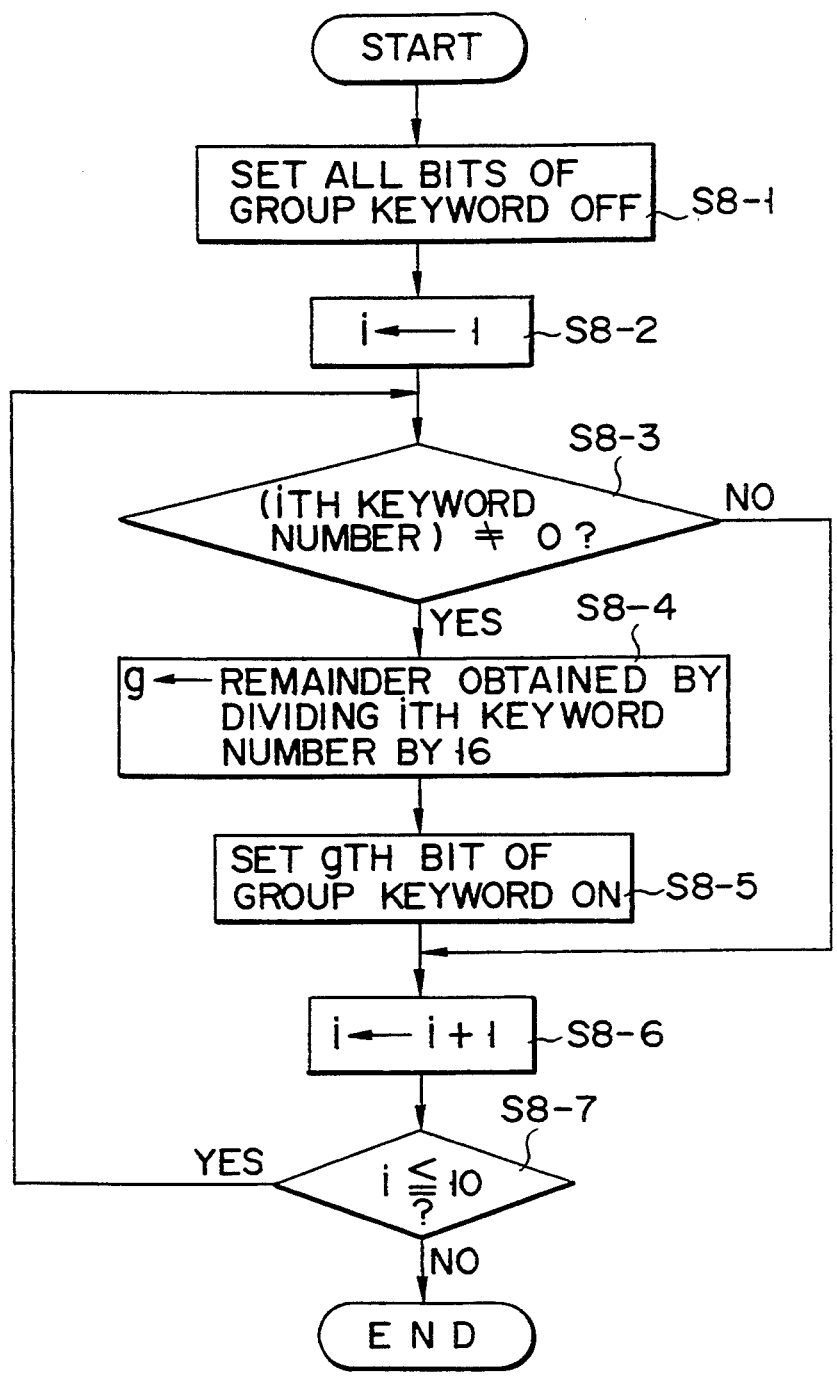
FIG. 8 is a flow chart for explaining generation of a group keyword.

Generation of the group keyword from the keyword number assigned to the image will be described below with reference to a flow chart shown in FIG. 8. That is, all bits in the group keyword are set to be "0" (S8-1), and the following process is repeated by substituting 1 to 10 with ith. The CPU 34 checks whether the ith keyword number (S8-2) assigned to the image is set to be "0" (S8-3). When the ith keyword number is set not to be "0", a bit corresponding to a remainder obtained by dividing the keyword number by 16 is set to be "1" (S8-4 and S8-5). Therefore, when an image number is set to be "1", since the keyword number is constituted by "1" and "2" as shown in FIG. 2b, the image number is determined to correspond to the groups "1" and "2" as described above. A group keyword "0000000000000110" (binary number) in which flags for the second and third bits of 16 bits are set (turned on), i.e., "0006" (hexadecimal number)is stored. The first to 10th keywords can be determined as described above (S8-6 and S8-7).

A retrieval process of images stored in the optical disk 20 will be described below with reference to a flow chart shown in FIG. 9. A retrieval mode using keywords is set by the keyboard 23, and a retrieval keyword corresponding to an image to be retrieved is input. The CPU 34 calculates a retrieval keyword number corresponding to the input retrieval keyword from the keyword correspondence table 26d (S9-1). The CPU 34 generates a retrieval group keyword from the retrieval keyword number (S9-2). In addition, the CPU 34 calculates a logical AND product between the retrieval group keyword and the group keyword corresponding to each image data stored in the group keyword management table 26e. Then, all image numbers in which the logic AND product corresponds to the retrieval group keyword are temporarily stored in the main memory as primary retrieval images (SP-3).

For example, when "0006" (hexadecimal number), i.e., "0000000000000110" (binary number), is set as a retrieval group keyword, an image number of a group in which the first and second bits are set to be "1" as a group keyword is extracted.

In other words, an image number corresponding to an image having a keyword belonging to the same group as that of a plurality of retrieval keywords is extracted in step SP-3 of FIG. 9.

Then, in step SP-4, CPU 34 reads out the keyword number from the image management table 26b, corresponding to the image number temporarily stored in the main memory 38, and stores the image numbers of images having keyword numbers corresponding to the retrieval keyword number in the main memory 38 as candidate images.

The image numbers of images having all keywords corresponding to the plurality of retrieval keyword are extracted.

The CPU 34 makes a list of the images (retrieval data) by data read from the image management table 26b with reference to the candidate image numbers in the main memory 38. The CPU 34 causes the CRT display unit 24 to display the list. When an operator cannot find a target retrieval image on the display, he inputs a keyword again. Otherwise, a retrieval image is designated (by an image number or the like), and retrieval execution is designated by the secondary retrieval means.

The CPU 34 reads out a start address corresponding to the designated image using the image management table 26b, a physical track address and a physical sector address corresponding to the read start address are calculated, and image data from the optical disk 20 is reproduced by the optical disk unit 22 by these addresses.

The image data of each scanning line is supplied from the optical disk unit 22. The CPU 34 supplies image data (compressed data) to the compression/expansion circuit 50. The image data is band-expanded by the compression/expansion circuit 50 and sequentially supplied to the page memory 40. The image stored in the page memory 40 is reduced by the enlargement/reduction circuit 46, output to the display memory 42, and stored in the display memory 42. Therefore, the display control unit 44 causes the CRT display unit 24 to display the content stored in the display memory 42.

As described above, after the primary retrieving process for coarsely retrieving a keyword is performed, the secondary retrieving process for retrieving a predetermined image having the retrieval keyword data is performed. Therefore, the number of images to be retrieved by keyword data, i.e., a data amount to be compared with a retrieval keyword can be largely decreased, and the keyword retrieval can be performed at high speed. For example, a group keyword is expressed by 2 bytes (16 bits), the number of images is 1,000, and the average number of keywords assigned to each image is 5. This keyword retrieval will be described below. Data of 1,000 cases×5×2 bytes=10,000 bytes (about 10 kB) must be read and compared with a retrieval keyword in a conventional technique. Under the above conditions, data of 1,000 cases×2 bytes (about 2 kB) is read, and the first retrieving process (the first image number extracting means) using a keyword is performed. The second retrieval process (the second image number extracting means) is performed on only the images selected by the primary retrieving process where the first and the second image number extracting means corresponds to primary retrieval means. At this time, the number of images selected by the primary retrieving process depends on a manner of assigning keywords to the stored images and a manner of classifying the keywords into groups. In the above case, when 80% or less of images are selected in the primary retrieving process, a total amount of data compared in the primary and secondary retrieving process is smaller than that of conventional retrieving process. When 10% of images are selected, data of 2,000 bytes+(100 cases×10 bytes)=3,000 bytes is compared. As a result, an amount of comparison data is decreased to about 30% compared with that of the conventional retrieving process.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image storage/retrieval apparatus comprising:

first storing means for storing a plurality of images;

second storing means for storing a plurality of retrieval data which are assigned image numbers corresponding to said plurality of images, respectively, where each retrieval data comprises a plurality of keywords;

third storing means for storing a plurality of keyword numbers corresponding to each of said plurality of keywords, respectively;

fourth storing means for storing a plurality of group keywords, where each group keyword corresponds to an image number stored in said second storing means, and where each group keyword is used for specifying groups of keywords obtained by grouping said keywords;

primary retrieval means for extracting candidate images from said first storing means using said group keywords, said primary retrieval means comprising:

input means for entering at least one retrieval keyword;

processing means for reading out from said third storing means a keyword number corresponding to each of said at least one retrieval keywords entered by said input means;

means for generating a retrieval group keyword based on said keyword numbers read by said processing means, wherein said generating means classifies said keywords into one of said group keywords using units which correspond to remainder values obtained when said keyword numbers are divided by a predetermined bit count, said group keywords having numbers which are each represented by a byte count;

first image number extracting means for sequentially comparing said plurality of group keywords stored in said fourth storing means with said retrieval group keyword generated by said generating means, and for extracting an image number having a group keyword which is the same as the retrieval group keyword generated by said generating means; and second image number extracting means for sequentially comparing said keyword numbers stored in said third storing means and corresponding to said image number extracted by said first image number extracting means with said at least one retrieval keyword entered by said input means, and for extracting an image number having a keyword coinciding with each of said at least one input retrieval keywords as a candidate image; and secondary retrieval means for retrieving a predetermined image, said secondary retrieval means comprising selecting means for selecting a desired image from said candidate images extracted by said second image number extracting means, and means for retrieving said image selected by said selecting means from said first storing means.

* * * * *